United States Patent [19]

Spaeth

[11] 4,373,268
[45] Feb. 15, 1983

[54] GEAR MEASURING MACHINE FOR INSPECTING HELICAL GEARS

[75] Inventor: Hans Spaeth, Kloten, Switzerland

[73] Assignee: Maag Gear-Wheel & Machine Company Ltd., Zürich, Switzerland

[21] Appl. No.: 328,750

[22] Filed: Dec. 8, 1981

[30] Foreign Application Priority Data

Dec. 23, 1980 [CH] Switzerland ............... 9546/80

[51] Int. Cl.³ .................... G01B 5/20; G01B 7/28
[52] U.S. Cl. .................... 33/179.5 R; 33/179.5 D
[58] Field of Search ............... 33/179.5 R, 179.5 D, 33/179.5 E, 179.5 A, 176 P, 147 M

[56] References Cited

U.S. PATENT DOCUMENTS

| | | | |
|---|---|---|---|
| 3,849,892 | 11/1974 | Fabish et al. | 33/179.5 R |
| 3,950,858 | 4/1976 | Donner et al. | 33/179.5 R |
| 4,285,133 | 8/1981 | Sterki | 33/179.5 R |
| 4,297,788 | 11/1981 | Sterki et al. | 33/179.5 R |
| 4,322,889 | 4/1982 | Guenter | 33/179.5 R |

FOREIGN PATENT DOCUMENTS 52-32359  3/1977  Japan .................. 33/179.5 R

Primary Examiner—Willis Little
Attorney, Agent, or Firm—Werner W. Kleeman

[57] ABSTRACT

A gear measuring machine for inspecting helical gears contains a feeler for sensing the tooth flank of the gear being tested. Since the contact point between the feeler and the tooth flank is located by the amount of the helix angle below a horizontal line extending through the feeler tip it is necessary when recording a profile diagram of the gear tooth to take into account the distance $r \cdot \cos \beta_b$ to obtain an exact zero point for the start of the profile diagram. To determine such zero point the gear measuring machine uses a digital circuit arrangement containing a generating or roll path counter and a correction counter. The correction counter continues to count until its count has reached a value corresponding to the aforementioned distance. Then the generating or roll path counter is started.

5 Claims, 7 Drawing Figures

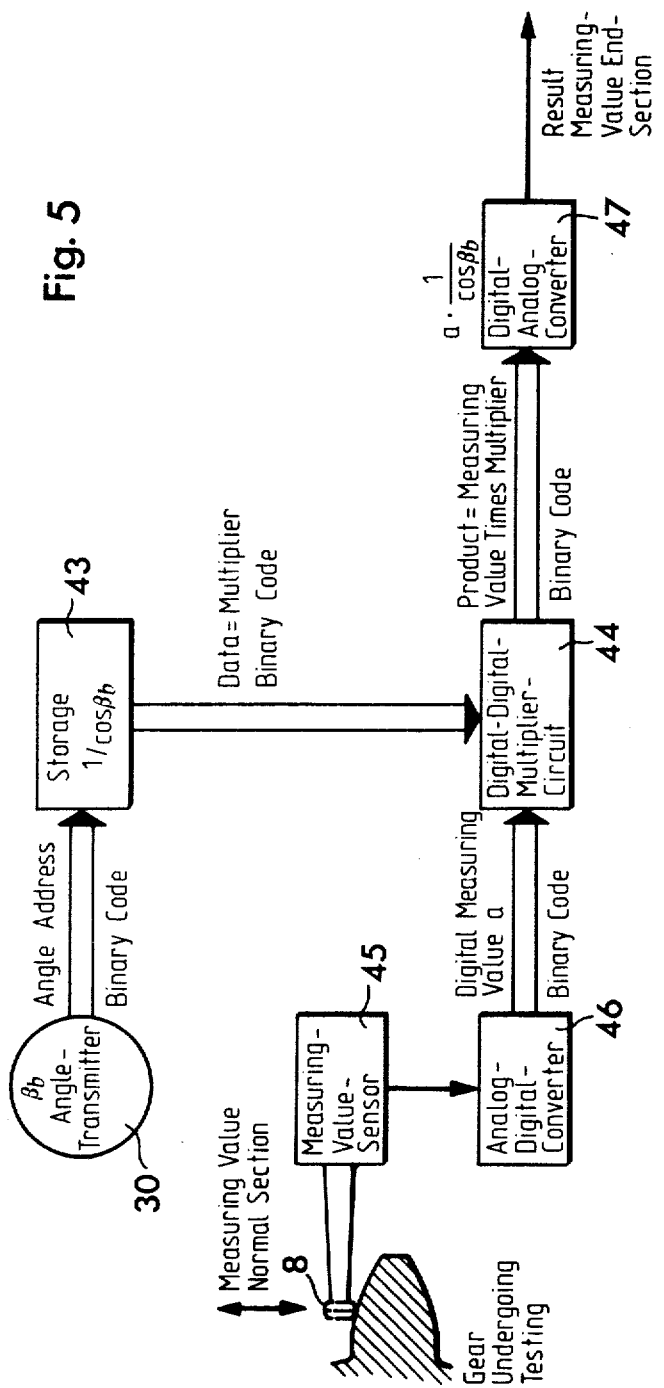

GEAR MEASURING MACHINE FOR INSPECTING HELICAL GEARS

BACKGROUND OF THE INVENTION

The present invention relates to a new and improved construction of gear measuring machine for inspecting or checking helical gears.

Generally speaking, the gear measuring machine for inspecting helical gears of the present development is of the type comprising a pick-up or feeler and a device for compensating the various feeler tip sizes or magnitudes and helix angles, and which device is connected to a radius transmitter or indicator and an angle transmitter or indicator.

A gear measuring machine of this type has become known to the art from the pamphlet A 59-D 3.77-2000u, published in March 1977 by MAAG Gear-Wheel Company Ltd. This machine, during profile measurements, enables compensating for the various feeler tip sizes and for the helix angles, but there only can be adjusted therewith a limited number of discrete feeler tip sizes by means of decade switches. For these feeler tip sizes the compensation for the helix angle then is performed by means of a potentiometer. Compensation by means of a potentiometer naturally is not very precise, so that the zero point, which has been corrected by virtue of the feeler radius and the helix angle, equally cannot be precisely determined. This zero or null point is required if charts or diagrams which have measured the generating or roll path at a gear checking or inspection machine are thereafter to be employed at a gear processing or fabricating machine. Furthermore, the compensations performed by means of the potentiometer are hardly reproducible even at the gear measuring machine, since it is practically impossible to adjust the potentiometer to the exact same value during a later measuring operation. Additionally, the heretofore known gear measuring machine only delivers measuring values in the perpendicular or normal section, i.e. values which have been measured by means of deflections of the feeler which are normal or perpendicular to the tooth flank. However, at gear processing machines the machining of gear flanks of gears often is performed from an end plane. Thus, there are required measuring values in the end section, which are not delivered by the prior art machine.

SUMMARY OF THE INVENTION

Therefore, it is a primary object of the present invention to provide a new and improved construction of gear measuring machine for inspecting helical gears in a manner not associated with the aforementioned drawbacks and shortcomings of the prior art.

Another important object of the present invention is to provide a new and improved construction of gear measuring machine of the aforementioned type, which is capable of delivering very precise and reproducible values for the zero point of the generating or roll path, i.e. for the beginning thereof in relation to a center of the machine.

Another important object of the present invention is to provide a new and improved construction of gear measuring machine of the aforementioned type which also delivers measuring values in end section of the tooth.

Now in order to implement these and still further objects of the invention which will become more readily apparent as the description proceeds the gear testing or inspecting machine, according to one embodiment of the invention, is manifested by the features that the angle transmitter or indicator delivers to a storage for trigonometric angle functions a binary coded address corresponding to the set helix angle. The output data of the storage constitutes a binary coded first multiplier indicating the helix angle and which is inputted to a first digital-digital multiplier circuit. This multiplier circuit multiplies the first multiplier with a binary coded value of the feeler tip radius furnished thereto by the radius transmitter. The output signal of the first digital-digital multiplier circuit is applied by means of a first D/A-converter to a first input of a comparator. A displacement path transmitter delivers by means of a correction counter a binary coded value, counted in steps from the machine center, to an input of a second digital-digital multiplier circuit. This second multiplier circuit receives at a further input binary coded reference values which constitute the quotient of the product delivered by the first digital-digital multiplier circuit and the steps, and forms the product from the steps and the reference values and applies such by means of a second D/A-converter to a second input of the comparator which, when both of its input signals are the same, delivers an output signal which starts a generating path or length counter.

According to another embodiment of the invention the angle transmitter delivers a binary coded address corresponding to the set helix angle to a storage for trigonometric angle functions. The output data of the storage constitutes a binary coded first multiplier indicating the helix angle and which is inputted to a digital-digital multiplier circuit. The multiplier circuit multiplies the multiplier with a binary coded value of the feeler tip radius delivered by the radius transmitter. The output signal of the digital-digital multiplier circuit is applied by means of a first D/A-converter to a first input of a comparator. A displacement path transmitter applies by means of a correction counter a binary coded value, counted in displacement path steps from the center of the machine, by means of a second D/A-converter to a second input of the comparator which, when both of its input signals are the same, delivers an output signal which starts a generating path or length counter.

Finally, a further development of the invention contemplates that a storage connected with the angle transmitter or indicator contains the reciprocal value of the cosine functions of the helix angle and delivers binary coded output signals as multiplier to a digital-digital multiplier circuit. This multiplier circuit additionally receives measuring values which are binary coded from a measuring value sensor connected with the feeler furnishing measuring values in normal section of the gear tooth. The multiplier circuit delivers the product of the measuring value and the multiplier to a D/A-converter which furnishes at its output the measuring value in the end section of the gear tooth.

With the first two embodiments referred to above the correction counter is started by the center of the machine and there is first then started a generating or roll path counter only at the moment when the comparator determines that the steps, which are counted by the correction counter, forming a certain fraction of the product of the feeler radius and the cosine of the helix angle, are equal to such product. Thus, the beginning of the profile with respect to the center of the machine is determined with extreme precision and especially so that it is reproducible with extreme accuracy.

The solution proposed by the second mentioned embodiment is simpler in as much as, in comparison to the solution of the first embodiment serving the same purpose, there can be eliminated the need for a reference transmitter, an A/D-converter and a digital-digital multiplier circuit.

With the third mentioned embodiment there is accomplished a digital multiplication of the digital value determined by the feeler with the reciprocal value of the cosine of the helix angle. Hence, there are furnished as the result measuring values in the end section of the gear tooth.

BRIEF DESCRIPTION OF THE DRAWINGS

The invention will be better understood and objects other than those set forth above will become apparent when consideration is given to the following detailed description thereof. Such description makes reference to the annexed drawings which illustrate three exemplary embodiments of the invention and wherein:

FIG. 5 illustrates a digital circuit arrangement for converting measuring values received in the normal or perpendicular section to measuring values in the end section of a gear tooth undergoing checking.

DETAILED DESCRIPTION OF THE PREFERRED EMBODIMENTS

Figure 1:
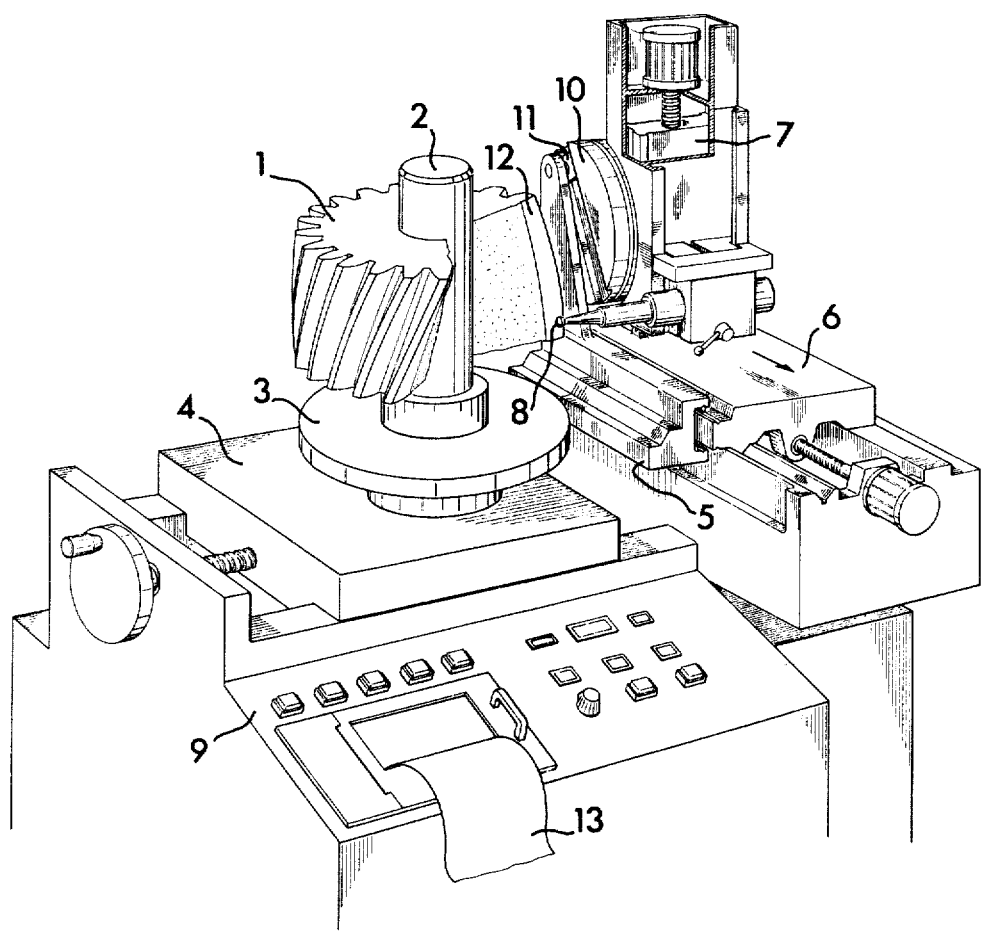
FIG. 1 illustrates a gear measuring machine for checking or inspecting helical gears according to the invention.
Figure 4:
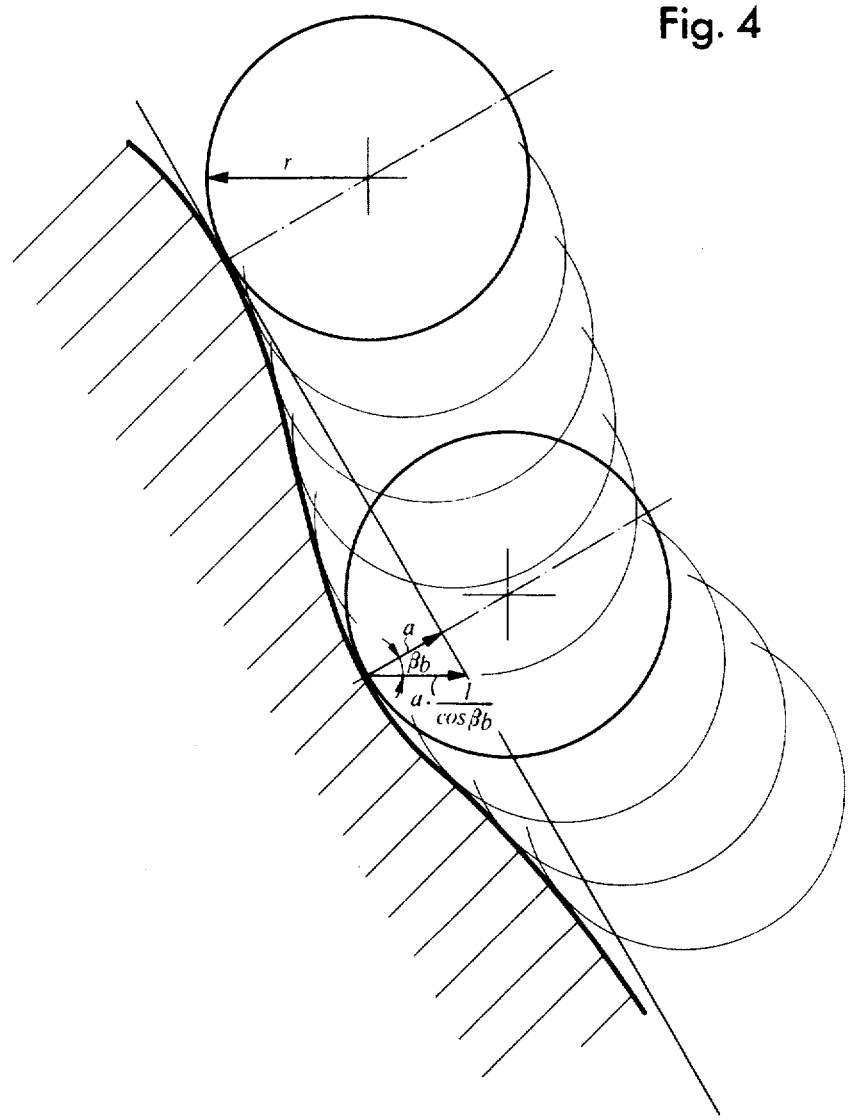
FIG. 4 is an explanatory diagram for explaining the relationship between a measuring value a and the helix angle $\beta_b$.

Describing now the drawings, FIG. 1 generally schematically illustrates the entire construction of a gear measuring or checking machine for inspecting or testing helical gears. A test or workpiece 1, the helical gear, is seated upon a rotatable mandrel 2 or the like. Secured to the same mandrel or shaft 2 is a substantially cylindrical disc 3, the diameter of which corresponds to the base circle diameter of the gear or workpiece 1 to be tested. This base cylinder or base circle disc 3 is pressed against a generating straight edge or bar 5 by means of a feed or advance carriage 4. If a generating cross-slide or carriage 6 is moved in the direction of the indicated arrow, then the cylindrical base circle disc or base cylinder 3 rolls without slipping upon the generating bar or straight edge 5, against which it bears under the action of any suitable spring means. During this rolling movement the edge of the pick-up or feeler 8, which is arranged upon a measuring slide 7, remains resiliently pressed against the tooth flank of the gear or workpiece 1 which is to be inspected. The not particularly referenced feeler edge of the feeler 8 is located exactly above the generating bar straight edge 5. If the flank profile of the gear tooth is involute-shaped, then the pick-up or feeler 8 remains in its position. However, if there exist deviations from the involute shape, then this feeler 8 is correspondingly deflected by the amount of such deviation, which feeler deflection has been indicated in FIG. 4 by reference character a. In an electronic measuring and recording device 9 the pick-up or feeler deflections a are translated and recorded. In FIG. 2 the pick-up or feeler deflections are indicated by means of a double-headed arrow which is normal or perpendicular to the tooth flank.

A grooved disc or cam 10—also referred to as a helix guide disc—which is arranged at the measuring slide 7 is optically adjusted to the helix angle of the relevant gear 1. For the tooth alignment or lead inspection the generating cross-slide or carriage 6 remains arrested in the position where the pick-up or feeler 8 contacts the tooth flank at the desired location of the tooth profile. If the measuring slide 7 and together therewith the grooved or helix guide disc 10 are displaced in vertical direction, there is imparted movement of the generating straight edge 5 which is guided by a groove block 11. Consequently, the base cylinder disc 3, which bears against the generating straight edge 5 under the action of spring means, and along therewith the gear or workpiece 1 are turned. Viewed in relative terms, the pick-up or feeler 8, which bears against the tooth flank 12 under the action of spring means, is thus guided along a tooth line which theoretically has the correct tooth helix angle. Any deviation of the tooth helix of the gear or workpiece 1 from the optically adjusted helix angle again causes a deflection of the pick-up or feeler 8. This deflection again is amplified in the electronic measuring and recording device 9 and recorded as a deviation from the straight line upon a printed-out diagram chart or tape 13.

Figures 2A, 2B:
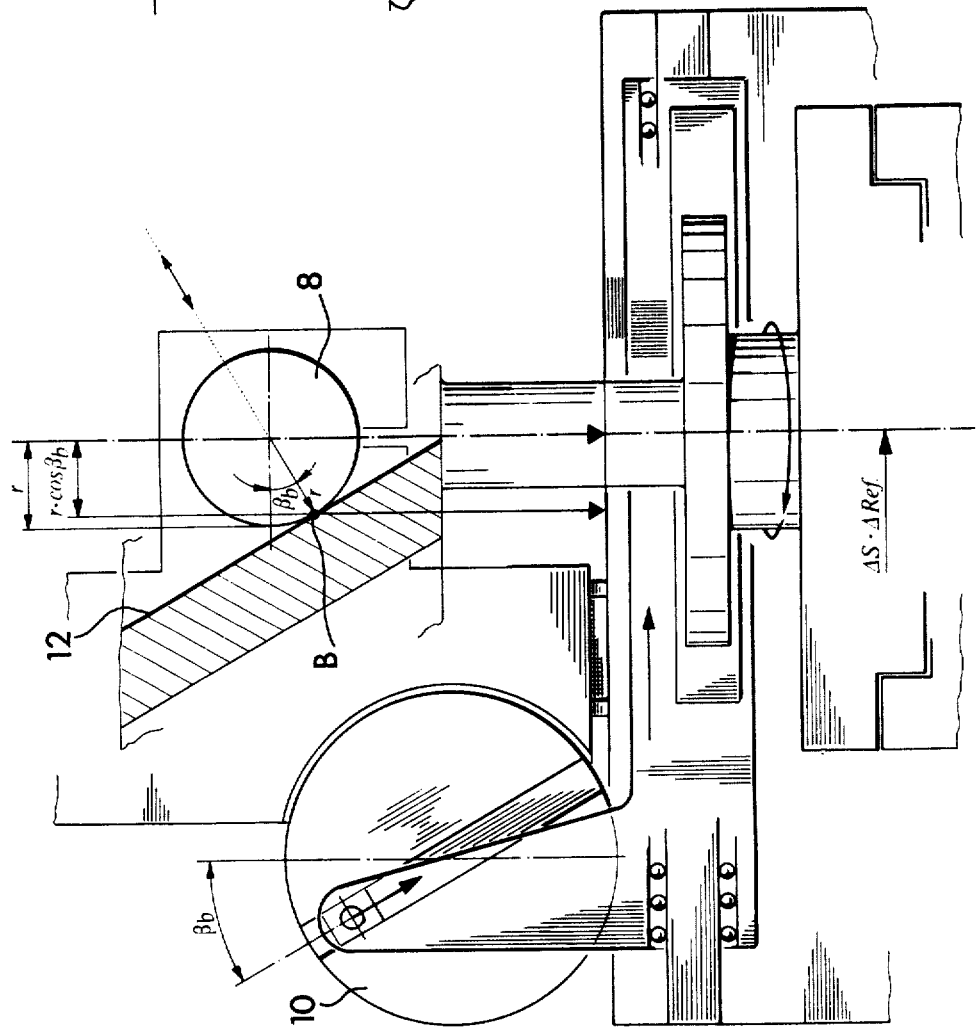
FIG. 2a illustrates a partial view of the gear measuring machine according to FIG. 1, wherein there is illustrated the relationship between a tooth flank under inspection and the feeler or pick-up.
FIG. 2b is an explanatory diagram.

FIG. 2a illustrates the relationship between the feeler 8 and the tooth flank 12 which is to be inspected and against which bears such pick-up or feeler 8. The tip of this feeler 8 has a radius r. Since the point of contact B between the feeler 8 and the tooth flank 12 is located by the amount of the helix angle $\beta_b$ below a horizontal line drawn through the center of the tip of the feeler 8, it is thus necessary, when recording or plotting a profile diagram at the gear measuring machine, to take into consideration the distance r·cos $\beta_b$ in order to obtain an exact zero or null point for the start of the profile diagram, so that the same can be transferred from the gear measuring machine to a gear processing machine. Furthermore, it is important that this zero point be as accurately reproducible as possible. As initially described, this cannot be achieved by means of a potentiometer as proposed by the previously discussed prior art machine. The exact zero point fixes the exact beginning of the generating or roll path in space, i.e. in relation to the machine. For determining this zero point there is used with the herein described gear measuring machine a digital circuit arrangement containing a main or generating path counter and an auxiliary or correction counter. The correction counter keeps on counting until its count has reached a value which corresponds to the distance r·cos $\beta_b$. Thereupon the generating or roll path counter is started, which will be described in greater detail hereinafter by referring to the embodiments of FIGS. 3a and 3b.

Figure 3A:
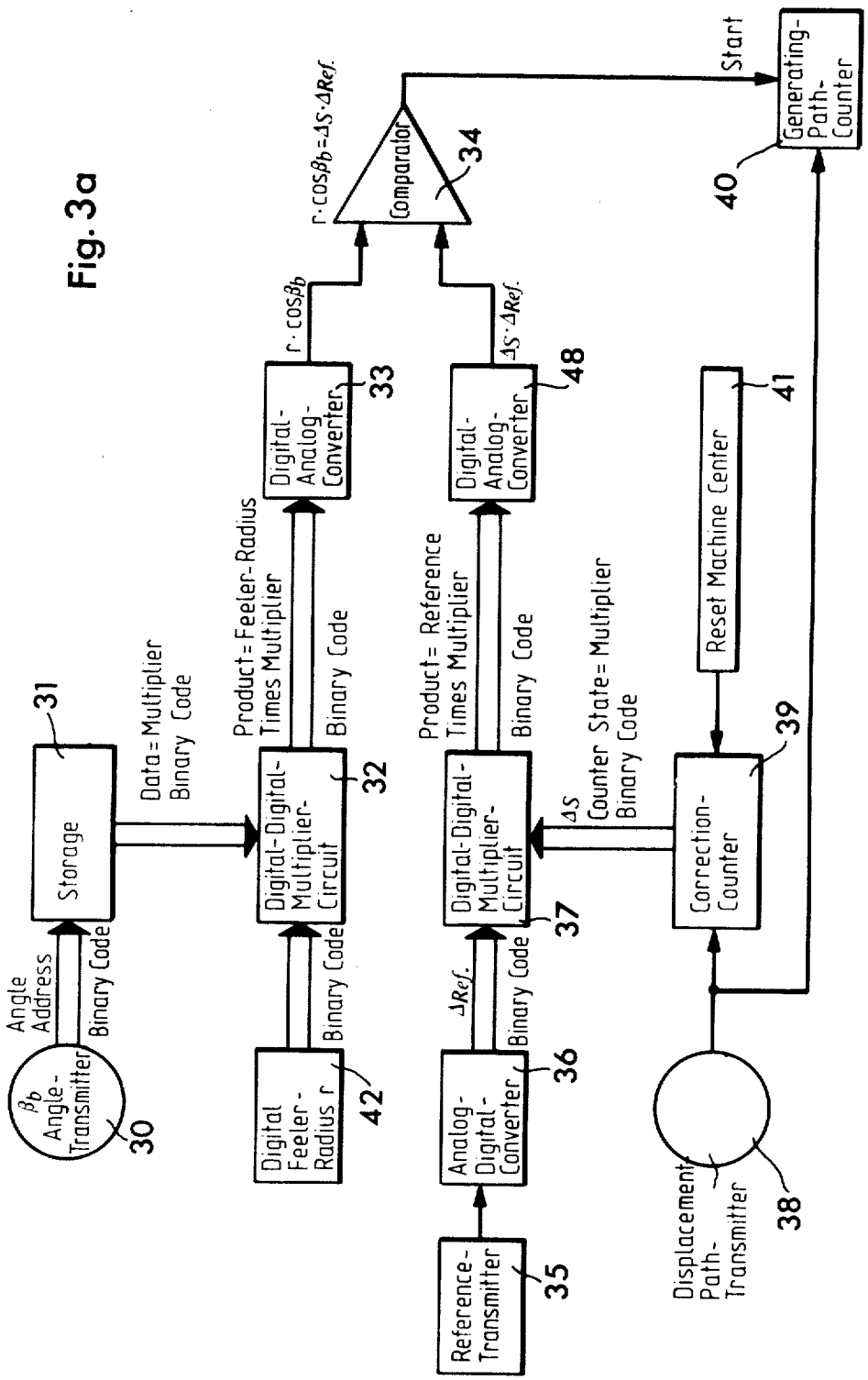
FIGS. 3a and 3b respectively illustrate two alternative embodiments of digital circuit arrangements for precisely starting a generating or roll path counter.
Figure 3B:
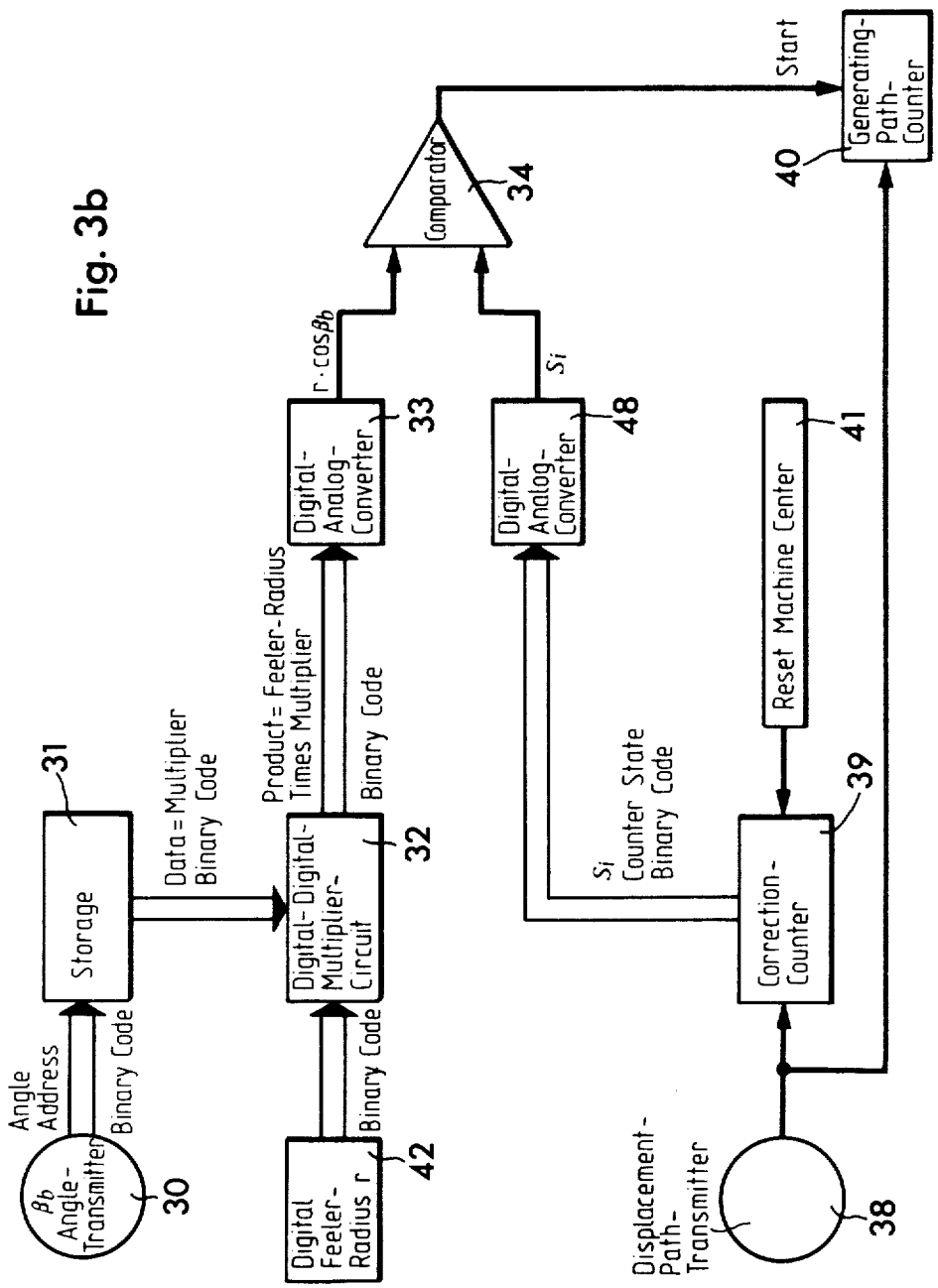

According to FIGS. 3a and 3b an angle transmitter 30, at which there is set the helix angle $\beta_b$ of the tooth flank 12 of the gear or workpiece 1, delivers a binary coded angle address, which corresponds to the helix angle, to a storage or memory 31. The storage addresses of the storage 31 contains the cosine functions of the helix angles. This storage 31 delivers binary coded data constituting a multiplier $\cos \beta_b$ to a digital-digital multiplier circuit 32. This digital-digital multiplier or multiplier circuit 32 further receives from a digital radius transmitter 42 the binary coded feeler radius r and forms the product of the feeler radius r and the multiplier $\cos \beta_b$, i.e. $r \cdot \cos \beta_b$. This product $r \cdot \cos \beta_b$ is delivered in binary coded form to a digital-analogue or D/A-converter 33, which applies the same to the first input of a comparator 34.

According to FIG. 3a, a reference transmitter 35 which supplies a reference voltage, delivers the same in the form of binary coded reference values ΔRef by means of an A/D-converter 36 to a second digital-digital multiplier circuit 37. The magnitude of the reference values ΔRef can best be seen by referring to the graph shown in FIG. 2b. The distance $r \cdot \cos \beta_b$ is known and determined. The step curve which is formed from the values ΔS and ΔRef can be varied with respect to ΔS or ΔRef. In the embodiment under discussion, however, a displacement path transmitter 38 establishes the displacement path steps ΔS to be counted, so that the amplitude steps ΔRef in FIG. 2b are thus automatically determined. If, for instance, there corresponds to a feeler radius of 10 mm a voltage of 10 volts, then the steps ΔS of the displacement path transmitter 38 determine the resolution of the correction path.

According to FIG. 3a the output of the displacement path transmitter 38 is connected to the inputs of a correction counter 39 and a generating or roll path counter 40. At the beginning of the gear tooth inspection or measuring operation the correction counter 39 starts counting from the center of the machine, here conveniently indicated by a block 41, the steps ΔS supplied by the displacement path transmitter 38 and delivers its momentary counter state to the digital-digital multiplier 37 in the form of a binary coded multiplier. At this time, the generating or roll path counter 40 has not yet started counting, since it only can be started by an output signal delivered from the comparator 34. The multiplier circuit 37 forms the product of the reference value ΔRef and the multiplier ΔS, which product is applied via a D/A-converter 48 to a second input of the comparator 34. At the moment when the two input signals delivered to the comparator 34 are equal, i.e. when the zero or null point is reached, then the comparator 34 delivers a starting signal to the generating or roll path counter 40, which now begins to count the actual generating or roll path. The beginning of the generating or roll path thus has a precisely defined position with respect to the center of the machine.

The modified construction of circuit of FIG. 3b differs from the circuit configuration of FIG. 3a in that here there have been omitted the reference transmitter 34, the A/D-converter 36 and the digital-digital multiplier 37, and the output of the correction counter 39 is directly connected to the input of the D/A-converter 48. The output signal of the correction counter 39, i.e. its counter state corresponds to the momentary actual value $s_i$ of the covered distance which has been measured by the displacement path transmitter 39 in displacement path steps. If this actual value $s_i$ equals the reference or set value, i.e. equals $r \cdot \cos \beta_b$, then the comparator 34 delivers the starting signal to the generating or roll path counter 40.

The feeler or pick-up 8 measures the tooth flank 12 in perpendicular or normal section, i.e. in a direction normal or perpendicular to the tooth flank 12. The measuring result in the normal section, which is furnished by the feeler 8, has been designated in FIG. 4 by reference character a. Since at a later stage when there is undertaken machining of the tooth flanks at a processing machine, where the diagram or graph supplied by the gear measuring machine is used, such machining work often is performed from the end plane, it thus is necessary that the measuring values be available in the end section, i.e. the measuring machine must deliver the values $a \cdot (1/\cos \beta_b)$ instead of the values a. For converting measuring values in the perpendicular or normal section to measuring values in the end section there is used according to the invention the digital circuit arrangement of FIG. 5 which will be more fully described hereinafter.

With this embodiment of gear inspecting machine, the angle transmitter 30 delivers binary coded angle addresses to a storage or memory 43 which contains the reciprocal values of the trigonometric functions $\cos \beta_b$, i.e. $1/\cos \beta_b$. The storage 43, which in the present embodiment under discussion is illustrated as a separate block, in practice constitutes a part of the storage or memory 31. The storage 43 delivers the binary coded data of $1/\cos \beta_b$ as a multiplier to a third digital-digital multiplier circuit 44. The measuring value a, which has been determined in the perpendicular or normal section, is delivered via a measuring value sensor 45 to an A/D-converter 46, which thereupon delivers the binary coded digital measuring values a to a further input of the digital-digital multiplier 44. This digital-digital multiplier or multiplier circuit 44 forms the product of the measuring value a and the multiplier which has been supplied by the storage 43, and delivers this product to a D/A-converter 47. At the output of this D/A-converter 47 there is thus available the measuring value in the end section, i.e. in the form $a \cdot \cos \beta_b$.

While there are shown and described present preferred embodiments of the invention, it is to be distinctly understood that the invention is not limited thereto but may be embodied and practiced within the scope of the following claims. ACCORDINGLY,

What I claim is:

1. A gear measuring machine for inspecting the gear teeth of helical gears, comprising:
   a feeler having a feeler tip;
   a radius transmitter;
   an angle transmitter;
   a storage connected with said angle transmitter and serving for the storage of trigonometric angle functions;
   said angle transmitter delivering to said storage binary coded addresses corresponding to a set helix angle;
   said storage for trigonometric functions delivering output data constituting a binary coded first multiplier indicating the helix angle of the gear tooth;
   a first digital-digital multiplier circuit to which there is delivered said multiplier;
   said digital-digital multiplier circuit multiplying said binary coded multiplier with a binary coded value of the feeler tip radius and delivering an output signal;
   said radius transmitter delivering said binary coded value of the feeler tip radius to said digital-digital multiplier circuit;
   a comparator having a first input and a second input;
   a first D/A-converter connected with said comparator;

the output signal of said first digital-digital multiplier circuit being applied to the first input of said comparator by means of said first D/A-converter;

a correction counter;

a second digital-digital multiplier circuit having a first input;

a displacement path transmitter for delivering a binary coded value to the first input of said second digital-digital multiplier by means of said correction counter;

said binary coded value of the displacement path transmitter being counted in steps from the center of the machine;

said second digital-digital multiplier circuit having a second input at which there are received binary coded reference values;

said reference values constituting the quotient of the product delivered by the first digital-digital multiplier circuit and the steps;

said second digital-digital multiplier circuit forming the product of said steps and said reference values;

a second D/A converter;

said second digital-digital multiplier circuit supplying said product to said second input of said comparator by means of said second D/A-converter; and a generating path counter;

said comparator, upon receiving two essentially equal input signals, delivering an output signal for starting said generating path counter.

2. The gear measuring machine as defined in claim 1, wherein:

said storage contains cosine functions of the helix angle; and said first D/A-converter delivers as an output signal the product of the feeler tip radius and the cosine of the helix angle.

3. A gear measuring machine for inspecting helical teeth of helical gears, comprising:

a feeler having a feeler tip;

a radius transmitter;

an angle transmitter;

a storage for trigonometric functions connected to said angle transmitter;

said angle transmitter delivering to said storage a binary coded address corresponding to a set helix angle;

said storage for trigonometric functions delivering output data forming a binary coded first multiplier indicating the helix angle;

a digital-digital multiplier circuit to which there is inputted said multiplier;

said digital-digital multiplier circuit multiplying said first multiplier with a binary coded value of the feeler tip radius delivered by said radius transmitter and furnishing an output signal;

comparator having a first input and a second input;

a first D/A-converter;

the output signal of said digital-digital multiplier circuit being delivered to the first input of said comparator by means of said first D/A-converter;

a correction counter;

a second D/A-converter;

a displacement path transmitter for supplying a binary coded value to the second input of said comparator by means of said correction counter and said second D/A-converter;

said binary coded value being counted in displacement path steps from the center of the machine; and said comparator, upon receiving two essentially equal input signals, delivering an output signal for starting a generating path counter.

4. The gear measuring machine as defined in claim 3, wherein:

said storage contains cosine functions of the helix angle; and said first D/A-converter delivering as an output signal the product of the feeler tip radius and the cosine of the helix angle.

5. A gear measuring machine for inspecting helical teeth of helical gears, comprising:

a feeler having a feeler tip;

a radius transmitter;

an angle transmitter;

a storage connected to said angle transmitter;

said storage containing the reciprocal value of cosine functions of the helix angle;

a digital-digital multiplier circuit;

said storage delivering binary coded output signals constituting a multiplier to said digital-digital multiplier circuit;

a measuring value sensor circuit for forming binary coded measuring values;

said digital-digital multiplier circuit receiving said binary coded measuring values from said measuring value sensor circuit;

said measuring value sensor circuit being connected to said feeler and delivering measuring values in a normal section of the inspected gear tooth;

a D/A-converter;

said digital-digital multiplier circuit delivering the product of the measuring value multiplied by the multiplier to said D/A-converter; and said D/A-converter delivering at its output a measuring value in an end section of the gear tooth being inspected.

* * * * *